(12) United States Patent
Solomon

(10) Patent No.: US 8,238,274 B2
(45) Date of Patent: Aug. 7, 2012

(54) DEVICE, SYSTEM, AND METHOD OF WIRELESS BEAMFORMING CALIBRATION

(75) Inventor: Trainin Solomon, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1185 days.

(21) Appl. No.: 12/045,080

(22) Filed: Mar. 10, 2008

(65) Prior Publication Data

US 2009/0225697 A1 Sep. 10, 2009

(51) Int. Cl.
*H04B 7/00* (2006.01)

(52) U.S. Cl. .................. 370/310; 370/338; 455/562.1

(58) Field of Classification Search .......... 370/310–350; 455/562.1, 561, 69, 63.1, 70; 375/267, 299
See application file for complete search history.

(56) References Cited

U.S. PATENT DOCUMENTS

2007/0298742 A1* 12/2007 Ketchum et al. ........... 455/186.1

OTHER PUBLICATIONS

IEEE P802.11n™/D2.00, Draft STANDARD for Information Technology—Telecommunications and information exchange between systems—Local and metropolitan area networks—Specific requirements—Part 11: Wireless LAN Medium Access Control (MAC) and Physical Layer (PHY) specifications, Feb. 2007, 498 pages.

* cited by examiner

*Primary Examiner* — Steven H Nguyen
*Assistant Examiner* — Kenan Cehic
(74) *Attorney, Agent, or Firm* — Shichrur & Co.

(57) ABSTRACT

Device, system, and method of wireless beamforming calibration. In some embodiments, a wireless communication device include a wireless communication unit to transmit a wireless beamforming calibration announcement packet to another wireless communication device, and to transmit a first null-data-packet after transmitting the announcement packet and prior to receiving a second null-data-packet from the other device. Other embodiments are described and claimed.

20 Claims, 4 Drawing Sheets

DEVICE, SYSTEM, AND METHOD OF WIRELESS BEAMFORMING CALIBRATION

BACKGROUND

Some wireless devices, e.g., mobile phones, laptop computers, or the like, may include wireless transceivers able to perform wireless beamforming communication in accordance with any suitable wireless communication protocols or standards, for example, the Institute of Electrical and Electronics Engineers (IEEE) 802.11n standard.

An implicit beamforming calibration process of calibrating a communication channel between a beamforming source and a beamforming destination, and/or a communication channel between the beamforming destination and the beamforming source, may include exchanging Null-Data-Packets (NDPs) between the source and destination.

According to the implicit beamforming calibration process, the source transmits a NDP announcement packet to the destination. Upon receiving the announcement packet the destination transmits to the source a response packet. Following the transmission of the response packet, the destination transmits a first NDP to the source. Upon receiving the first NDP, the source transmits to the destination a second NDP followed by a calibration complete packet. Upon receiving the calibration complete packet, the destination transmits to the source an acknowledgement packet.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
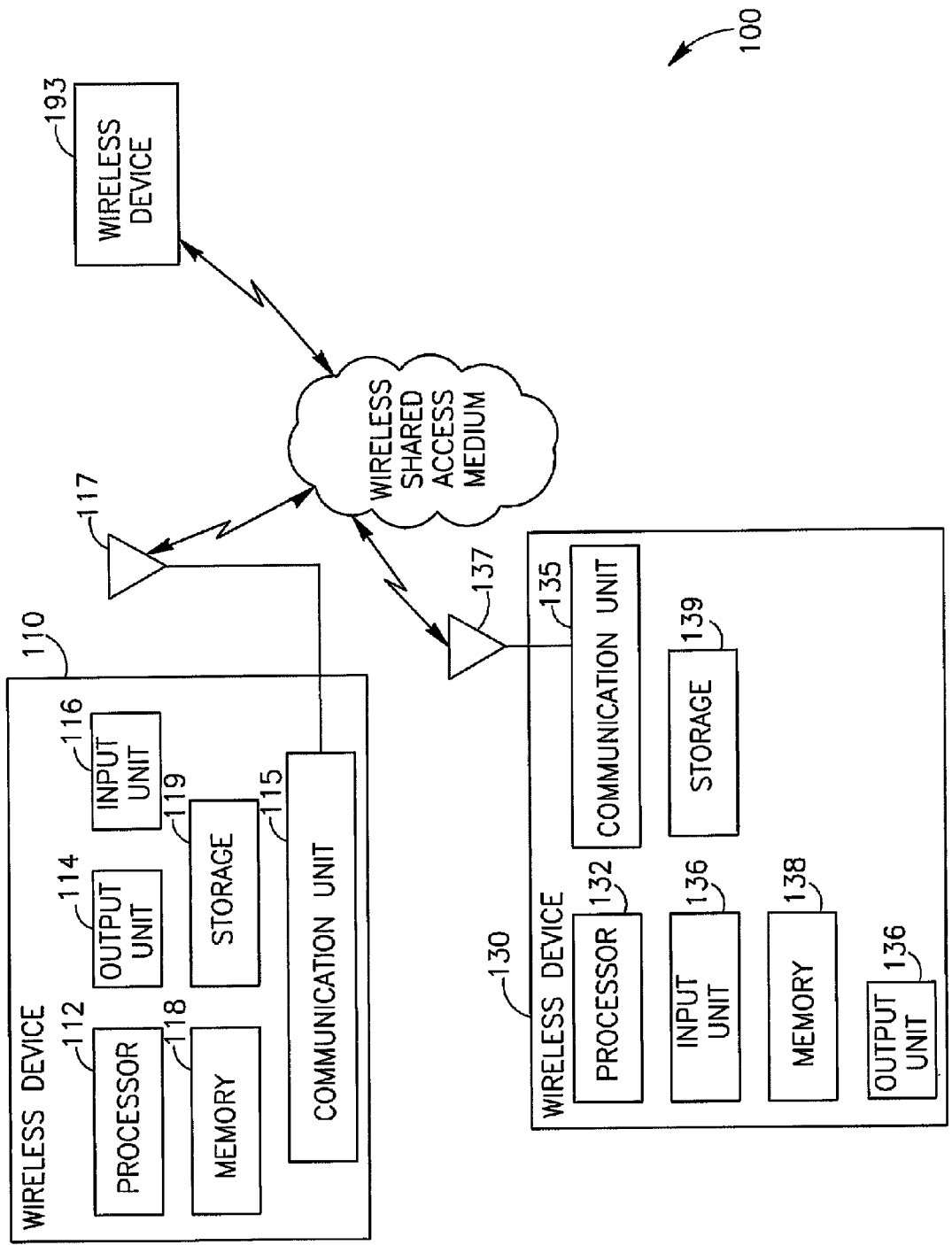
FIG. 1 is a schematic block diagram illustration of a system in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments may utilize wired communication and/or wireless communication.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11-2007, 802.11n, 802.15, 802.16, 802.16d, 802.16e, 802.20, 802.21 standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth (RTM), Global Positioning System (GPS), Wi-Fi, Wi-Max, ZigBee (TM), Ultra-Wideband (UWB), Global System for Mobile communication (GSM), 2 G, 2.5 G, 3 G, 3.5 G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a desktop computer capable of wireless communication, a mobile phone, a cellular phone, a laptop or notebook computer capable of wireless communication, a PDA capable of wireless communication, a handheld device capable of wireless communication, a portable or non-portable device capable of wireless communication, or the like. In some embodiments, a wireless device may be or may include a peripheral that is integrated with a computer, or a peripheral that is attached to a computer. In some embodiments, the term "wireless device" may optionally include a wireless service.

In some non-limiting embodiments, the term "Null-Data-Packet" (NDP) as used herein may relate to a packet, frame, block, transmission unit, and/or message including substantially no data. For example, the NDP may include a Physical Layer Protocol Data Unit (PPDU) including substantially no data field, e.g., as defined by the "IEEE-Std 802.11n—High throughput extension to the 802.11" standard and/or future versions and/or derivatives thereof. The NDP may be used, for example, as a training sequence for channel calibration. An intended destination and/or a source of the NDP may be determined, for example, according to address and/or destination fields of an announcement packet preceding the NDP.

FIG. 1 schematically illustrates a block diagram of a system 100 in accordance with some demonstrative embodiments.

System 100 includes, for example, a wireless communication device 110 able to wirelessly communicate with one or more other devices, for example, a wireless communication device 130, e.g., through a wireless shared access medium 140. Components of system 100 may be able to wirelessly communicate with other wireless devices, for example, a wireless Access Point (AP), a wireless Base Station (BS), a wireless controller, a wireless router, a component of an ad-hoc network operating as an AP of a Basic Service Set (BSS), a device operating as AP in an Independent BSS (IBSS), an AP or a device able to connect among multiple wireless communication devices, a device able to form a wireless communication network, a device able to relay among wireless communication devices, or the like.

Devices 110 and/or 130 include, for example, a wireless device, a laptop computer, a notebook computer, a desktop computer, a tablet computer, a PDA device, a cellular phone, a mobile phone, a hybrid device (e.g., combining cellular phone functionalities with PDA device functionalities), a relatively small computing device, a non-desktop computer, a portable device, a handheld device, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, or the like.

Device 110 includes, for example, a processor 112, an input unit 114, an output unit 116, a memory unit 118, a storage unit 119, and a communication unit 115. Device 130 includes, for example, a processor 132, an input unit 134, an output unit 136, a memory unit 138, a storage unit 139, and a communication unit 135. Devices 110 and/or 130 may optionally include other suitable hardware components and/or software components. In some embodiments, some or all of the components of device 110 and/or device 130 may be enclosed in a common housing or packaging, and may be interconnected or operably associated using one or more wired or wireless links. In other embodiments, components of device 110 and/or device 130 may be distributed among multiple or separate devices or locations.

Processors 112 and/or 132 include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processors 112 and/or 132 execute instructions, for example, of an Operating System (OS) of device 110 and/or device 130, respectively; and/or of one or more applications.

Input units 114 and/or 134 include, for example, a keyboard, a keypad, a mouse, a touch-pad, a track-ball, a stylus, a microphone, or other suitable pointing device or input device. Output units 116 and/or 136 include, for example, a monitor, a screen, a Cathode Ray Tube (CRT) display unit, a Liquid Crystal Display (LCD) display unit, a plasma display unit, one or more audio speakers or earphones, or other suitable output devices.

Memory units 118 and/or 138 include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage units 119 and/or 139 include, for example, a hard disk drive, a floppy disk drive, a Compact Disk (CD) drive, a CD-ROM drive, a Digital Versatile Disk (DVD) drive, or other suitable removable or non-removable storage units. Memory unit 118 and/or storage unit 119, for example, store data processed by device 110; and/or memory unit 138 and/or storage unit 139, for example, store data processed by device 130.

Communication units 115 and/or 135 include, for example, multiple wireless and/or wired transmitters, receivers and/or transceivers able to send and/or receive wireless and/or wired communication signals, Radio Frequency (RF) signals, frames, blocks, transmission streams, packets, messages, data items, and/or data. For example, communication units 115 and/or 135 may include or may be implemented as part of a wireless multi-radio Network Interface Card (NIC).

Communication units 115 and/or 135 may include, or may be associated with, one or more antennas or one or more sets of antennas 117 and/or 137, respectively. Antennas 117 and/or 137 may include, for example, an internal and/or external RF antenna, a dipole antenna, a monopole antenna, an omni-directional antenna, an end fed antenna, a circularly polarized antenna, a micro-strip antenna, a diversity antenna, or other type of antenna suitable for transmitting and/or receiving wireless communication signals, blocks, frames, transmission streams, packets, messages and/or data.

In some embodiments, two or more devices of system 100 may be capable of performing beamforming communication. For example, a first device ("the source device") of system 100, e.g., communication device 110, may transmit a beamforming transmission to a second device of system 100 ("the destination device"), e.g., device 130, as described in detail below.

In some demonstrative embodiments, devices 110 and 130 may exchange first and/or second NDPs, respectively, e.g., as part of an implicit beamforming calibration process, to calibrate a communication channel ("downstream channel") between devices 110 and 130, and/or a communication channel ("upstream channel") between devices 130 and 110. In one example, devices 110 and 130 may perform a unidirectional implicit beamforming process, e.g., to calibrate one of the upstream and downstream channels. In another example, devices 110 and 130 may perform a bidirectional implicit beamforming process, e.g., to calibrate both the upstream and downstream channels.

In some embodiments, devices 110 and 130 may use a single announcement packet to announce both the first and second NDPs, e.g., as described below.

In some demonstrative embodiments, wireless communication unit 115 may transmit a wireless beamforming calibration announcement packet to device 130. Wireless communication unit 115 may transmit a first NDP after transmitting the announcement packet and prior to receiving a second NDP from device 130, e.g., as described below.

In some demonstrative embodiments, wireless communication unit 135 may receive the wireless beamforming calibration announcement packet from device 110, transmit a wireless beamforming calibration response packet to device 110, receive the first NDP from device 110, and transmit the second NDP after receiving the first NDP, as described below.

In some embodiments, communication unit 115 may transmit a calibration-complete packet to device 130, for example, after receiving the second NDP, e.g., as described below.

In some embodiments, wireless communication unit 135 may transmit an acknowledgement packet to device 110, for example, after receiving the calibration-complete packet, e.g., as described below.

In some demonstrative embodiments, wireless communication unit 115 may perform implicit beamforming calibration of the beamforming channel between devices 110 and 130 based on the second NDP.

In some demonstrative embodiments, wireless communication unit 135 may perform implicit beamforming calibration of the beamforming channel between devices 130 and 110 based on the first NDP.

In some demonstrative embodiments, devices 110 and 130 may implement a Request-to-Send (RTS)/Clear-to-Send (CTS) mechanism to protect the exchange of the first and second NDPs, for example, from potential collision with one or more other packets from one or more other devices, e.g., another wireless communication device 193 communicating over medium 140.

In some embodiments, devices 110 and 130 may combine the RTS/CTS mechanism with the NDP announcement of the calibration, e.g., as described below. For example, the announcement packet transmitted by wireless communication unit 115 may include a RTS indication, and the response packet transmitted by wireless communication unit 135 may include a CTS indication, e.g., as described below with reference to FIGS. 3A and/or 3B.

In some embodiments, the announcement packet transmitted by wireless communication unit 115 may include a Calibration Position (CP) field to indicate whether devices 110 and 130 are to perform a unidirectional calibration sequence or a bidirectional calibration sequence, e.g., as described below. In one example, the CP field of the announcement packet may have a first value, e.g., one, to indicate a bidirectional calibration sequence; and a second value, e.g., zero, to indicate a unidirectional calibration sequence.

In some embodiments, the response packet transmitted by wireless communication unit 135 and/or the calibration-complete packet transmitted by wireless communication unit 115 may include a CP field to indicate a relative ordering between the response and calibration-complete packets, e.g., as described below. In one example, the CP field of the response and calibration complete packets may have the values two and three, respectively.

In some embodiments, a wireless communication device receiving one or more NDPs ("the receiving device"), e.g., wireless communication unit 135 and/or wireless device 193, may determine an intended destination of the received NDPs based on first and second address fields and/or the CP field of the announcement packet preceding the NDPs. For example, the receiving device may determine that an intended destination of an NDP is equal to a receiver address (RA) field of the announcement packet, e.g., if the NDP is a first NDP following the announcement packet. If the CP field of the announcement packet indicates bidirectional calibration, e.g., the CP field is set to the value one, then an intended destination of a second NDP received following the announcement packet may be equal to a transmitter address (TA) field of the announcement packet.

In some embodiments, the receiving device may determine the source of the received NDPs based on the announcement packet. For example, the receiving device may determine that the source of a first NDP received following the announcement packet is equal to the TA of the announcement packet.

If the CP field of the announcement packet indicates bidirectional calibration, e.g., the CP field is set to the value one, then a source of the second NDP received following the announcement packet may be equal to the RA field of the announcement packet.

Figure 2:
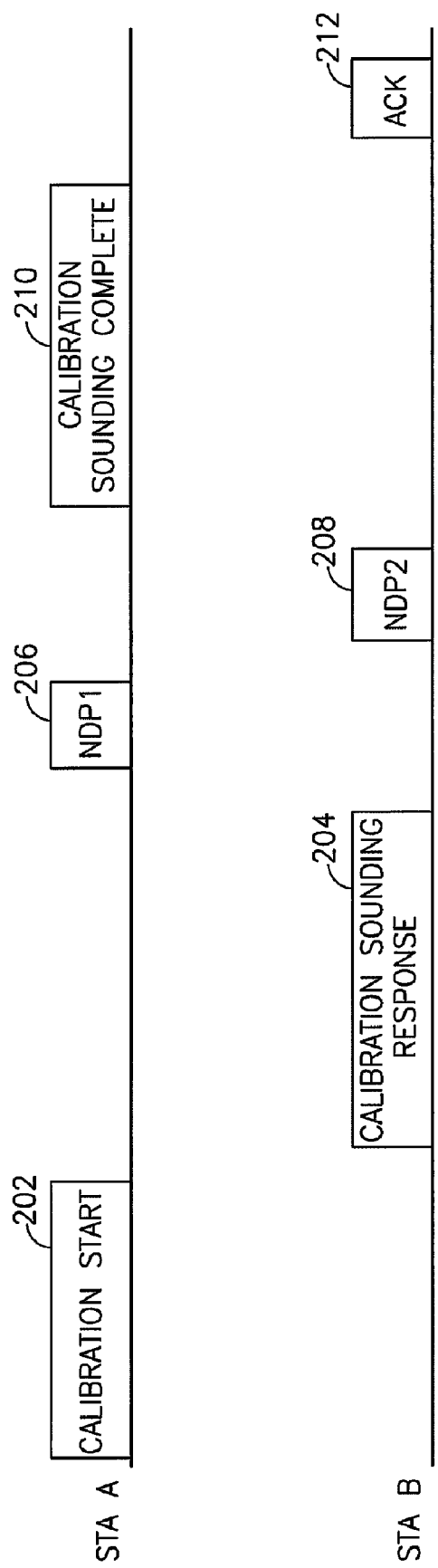
FIG. 2 is a schematic illustration of a sequence of wireless transmissions exchanged between a beamforming source device and a beamforming destination device, in accordance with some demonstrative embodiments.

Reference is made to FIG. 2, which schematically illustrates a sequence of wireless transmissions exchanged between a beamforming source device and a beamforming destination device, in accordance with some demonstrative embodiments. In some non-limiting embodiments, the sequence of FIG. 2 may be performed by devices of system 100 (FIG. 1), for example, device 110 (FIG. 1) and device 130 (FIG. 1), as part of an implicit beamforming calibration.

As shown in FIG. 2, the source device may transmit to the destination device a calibration announcement packet 202, e.g., in the form of a calibration start frame as described below.

Figure 3A:
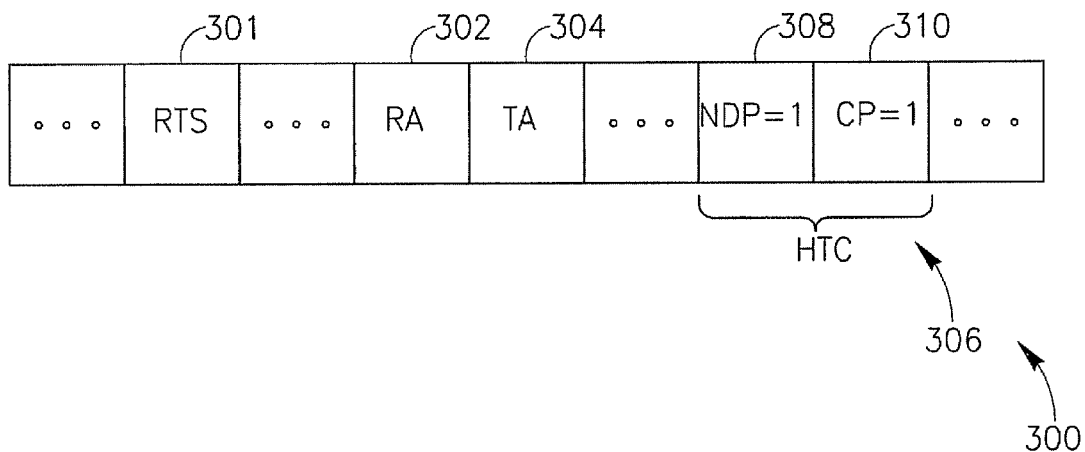
FIG. 3A is a schematic illustration of a calibration announcement frame in accordance with some demonstrative embodiments.

Reference is made to FIG. 3A, which schematically illustrates a calibration announcement frame 300, in accordance with some demonstrative embodiments. In some non-limiting embodiments, frame 300 may include or may be packet 202 (FIG. 2). Frame 300 may include a High Throughput Control (HTC) field 306. HTC field 306 may include a Calibration Position (CP) subfield 310 set to the value 1, an NDP Announcement subfield 308 set to the value 1, and/or a CSI/Steering subfield (not shown) set to the value 1. Frame 300 may include a type indicator having a value indicating that the frame should be treated as a Quality-of-Service (QoS) data frame, a management frame, or a control frame.

Referring back to FIG. 2, after receiving announcement packet the destination device may transmit a response packet 204, e.g., in the form of a calibration response frame as described below. The destination device may transmit response packet 204, for example, in a Short Inter-Fame Space (SIFS) time, e.g., if packet 202 requires an immediate Media-Access-Control (MAC) response.

Figure 3B:
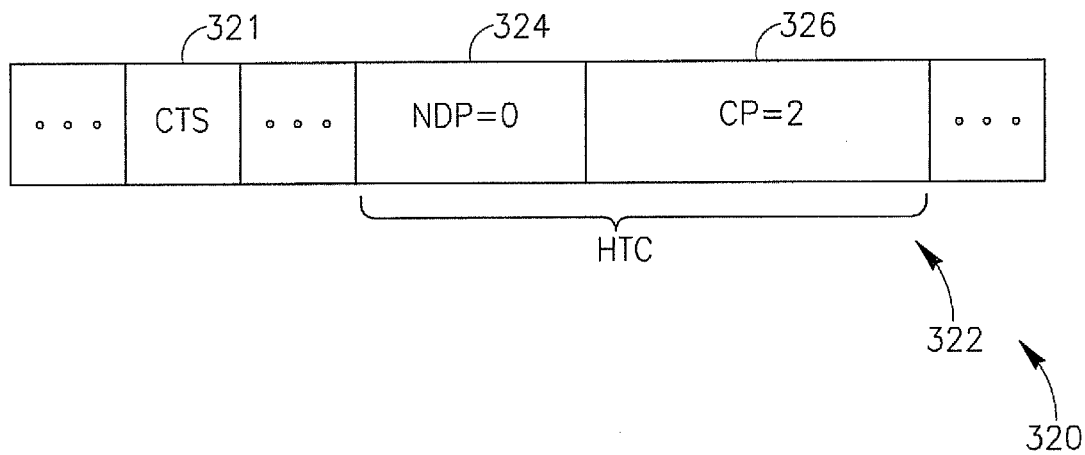
FIG. 3B is a schematic illustration of a calibration response frame in accordance with some demonstrative embodiments.

Reference is made to FIG. 3B, which schematically illustrates a calibration response frame 320, in accordance with some demonstrative embodiments. In some non-limiting embodiments, frame 320 may include or may be packet 204 (FIG. 2). Frame 320 may include an HTC field 322. HTC field 322 may include a CP subfield 326 set to the value 2, and/or an NDP Announcement subfield 324 set to the value 0. Frame 320 may include a type indicator having a value indicating that the frame should be treated as an Acknowledgement (ACK) frame.

Referring back to FIG. 2, in some embodiments, the source and destination devices may implement a protection mechanism, e.g., a RTS/CTS mechanism. In one example, announcement packet 202 may include a RTS indication, and/or response packet 204 may include a CTS indication. For example, the calibration start frame of FIG. 3A may include a type indicator 301 (FIG. 3A) having a value indicating that the frame should be treated as a RTS frame; and/or the calibration response frame of FIG. 3B may include a type indicator 321 (FIG. 3B) having a value indicating that the frame should be treated as a CTS frame, e.g., if packet announcement 202 includes the RTS indication.

As shown in FIG. 2, the source device may transmit a first NDP 206. In one example, the source device may transmit NDP 206 a SIFS after receiving response packet 204, e.g., if packet 202 requires an immediate MAC. In another example, the source device may transmit NDP 206 a SIFS after transmitting announcement packet 202, e.g., if packet 202 does not require an immediate MAC.

In some embodiments, the destination device may receive NDP 206 and estimate a Multiple-Input-Multiple-Output (MIMO) channel from the source device to the destination device, based on NDP 206.

The destination device may transmit a second NDP 208 after receiving NDP 206, e.g., a SIFS interval after receiving NDP 208.

In some embodiments, the source device may receive NDP 208 and estimate a MIMO channel from the destination device to the source device, based on NDP 208.

In some embodiments, the source device may transmit to the destination device a calibration-complete packet 210 after receiving the NDP 208, e.g., a SIFS interval after receiving NDP 208. Calibration-complete packet 210 may include, for example, a calibration complete frame including a type indicator having a value indicating that the frame should be treated as a Quality-of-Service (QoS) null-data frame, having a HTC field, and/or having a CP field set to the value 3.

In some embodiments, the destination device may transmit an ACK packet 212 to the source device, after receiving calibration-complete packet 210.

In some demonstrative embodiments, the sequence of transmissions of FIG. 2 may allow exchanging one or more NDPs, e.g., NDPs 206 and 208, as part of an implicit beamforming calibration between a source device and a destination device, such that an initiator of the implicit beamforming calibration, e.g., the source device, transmits a first NDP of the sequence, e.g., NDP 206. As a result, the source and/or destination devices, e.g., devices 110 and/or 130 (FIG. 1) may have an improved degree of compatibility and/or coexistence with other devices, e.g., device 193 (FIG. 1), which may not support implicit beamforming.

Figure 4:
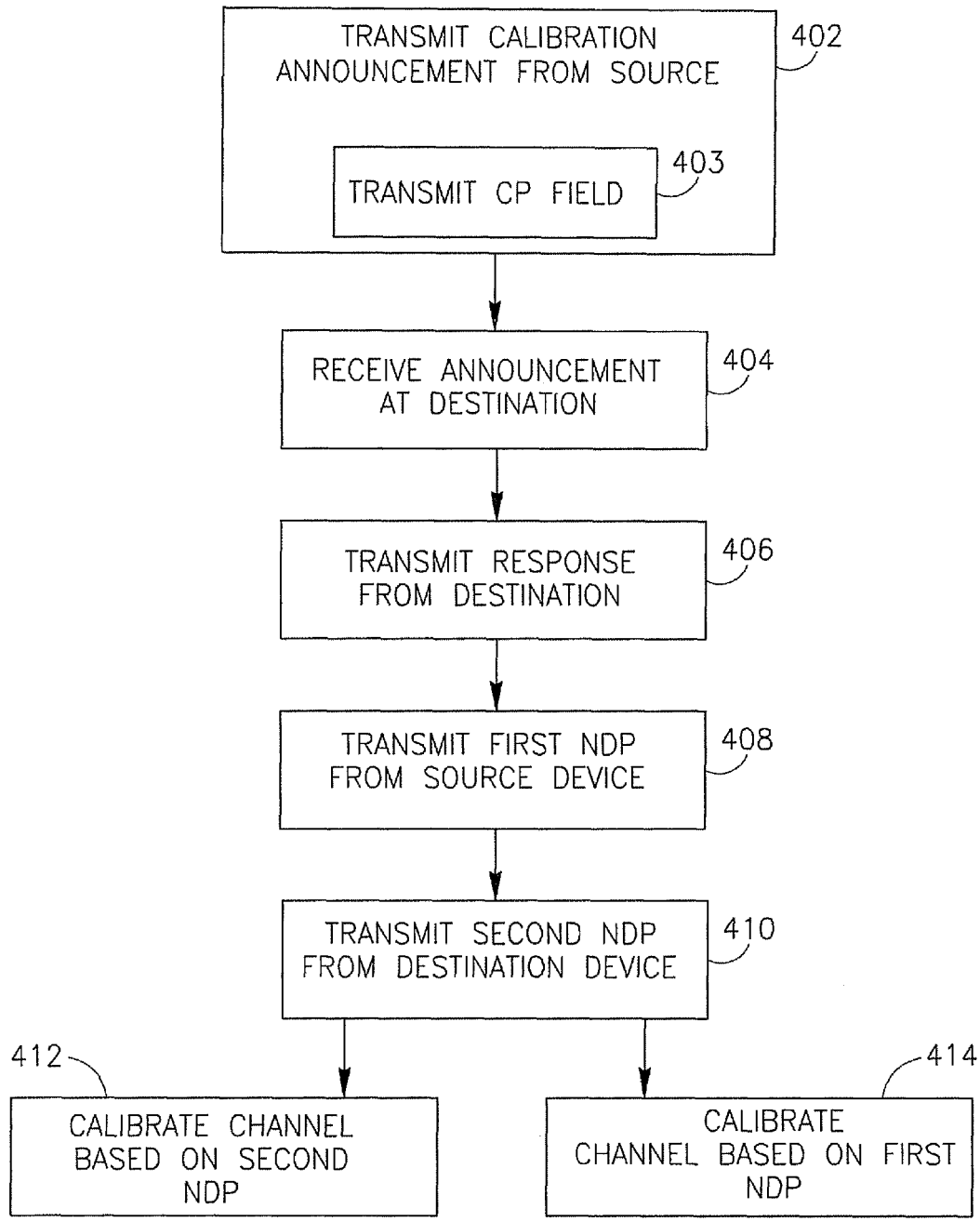
FIG. 4 is a schematic flow-chart illustration of a method of wireless beamforming communication, in accordance with some demonstrative embodiments.

Reference is made to FIG. 4, which schematically illustrates a method of wireless beamforming communication, in accordance with some demonstrative embodiments. In some non-limiting embodiments, one or more operations of the method of FIG. 4 may be performed by one or more wireless communication devices, e.g., devices 110 and 130 (FIG. 1), of a communication system, e.g., system 100 (FIG. 1).

As indicated at block 402, the method may include transmitting a wireless beamforming calibration announcement packet from a first wireless communication device to a second wireless communication device. For example, device 110 (FIG. 1) may transmit announcement packet 202 (FIG. 2) to device 130 (FIG. 1), e.g., as described above.

As indicated at block 403, transmitting the announcement packet may include transmitting an announcement packet including a calibration position field to indicate one of a unidirectional calibration sequence and a bidirectional calibration sequence, e.g., as described above.

As indicated at block 404, the method may include receiving the announcement packet at the second. For example, device 130 (FIG. 1) may receive announcement packet 202 (FIG. 2) from device 110 (FIG. 1), e.g., as described above.

As indicated at block 406, the method may include transmitting a wireless beamforming calibration response packet from the second device to the first device. For example, device 130 (FIG. 1) may transmit response packet 204 (FIG. 2) to device 110 (FIG. 1), e.g., as described above.

As indicated at block 408, the method may include transmitting from the first device a first NDP following the announcement packet and prior to receiving a second NDP from the second device. In some embodiments, the announcement packet may include a RTS indication, and transmitting the first NDP may include transmitting the first NDP after receiving a response including a CTS indication from the second device, e.g., as described above.

As indicated at block 410, the method may include transmitting a second NDP from the second device, after receiving the first NDP, e.g., as described above.

As indicated at block 412, the method may include performing implicit beamforming calibration of a beamforming channel between the second and first devices based on the second NDP, e.g., as described above.

As indicated at block 414, the method may include performing implicit beamforming calibration of a beamforming channel between the first and second devices based on the first NDP, e.g., as described above.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and/or an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless communication device comprising:
a wireless communication unit to transmit a wireless beamforming calibration announcement packet to another wireless communication device to announce both first and second null-data-packets to be exchanged between said wireless communication unit and the other wireless communication device, to transmit the first null-data-packet after transmitting said announcement packet, and to receive the second null-data-packet from the other device immediately successive to the first null-data-packet and prior to receiving another communication from the other wireless communication device,
wherein, prior to transmitting said first null-data-packet, said wireless communication unit is to receive from the other wireless communication device a response packet, and wherein both said beamforming calibration announcement packet and said response packet comprise an announcement bit, the announcement bit of said beamforming calibration announcement packet having a first value, and the announcement bit of said response packet having a second value, different from said first value.

2. The wireless communication device of claim 1, wherein said beamforming calibration announcement packet comprises a request-to-send indication, and wherein said wireless communication unit is to transmit said first null-data-packet after receiving a response including a clear-to-send indication from the other wireless communication device.

3. The wireless communication device of claim 1, wherein said wireless communication unit is capable of performing calibration of a beamforming channel with the other wireless communication device based on said second null-data-packet.

4. The wireless communication device of claim 3, wherein said wireless communication unit is to transmit a calibration-complete packet to the other wireless communication device after receiving said second null-data-packet.

5. The wireless communication device of claim 1, wherein said beamforming calibration announcement packet comprises a calibration position field to indicate one of a unidirectional calibration sequence and a bidirectional calibration.

6. A wireless communication device comprising:
a wireless communication unit to receive a wireless beamforming calibration announcement packet from another wireless communication device, to receive a first null-data-packet from the other wireless communication device, and to transmit a second null-data-packet immediately after receiving said first null-data-packet and prior to transmitting another packet to the other wireless communication device, wherein, prior to receiving said first null-data-packet, said wireless communication unit is to transmit a response packet, and wherein both said beamforming calibration announcement packet and said response packet comprise an announcement bit, the announcement bit of said beamforming calibration announcement packet having a first value, and the announcement bit of the response packet having a second value, different from said first value.

7. The wireless communication device of claim 6, wherein said beamforming calibration announcement and response packets comprise request-to-send and clear to send packets, respectively.

8. The wireless communication device of claim 7, wherein said wireless communication unit is capable of performing implicit beamforming calibration of a beamforming channel based on said first null-data-packet and to transmit an acknowledgement packet to the other wireless communication device after receiving a calibration-complete packet from the other wireless communication device.

9. The wireless communication device of claim 8, wherein said wireless communication unit is to transmit said second null-data-packet within a Short-Inter-Frame-Space (SIFS) after receiving said first null-data-packet.

10. The wireless communication device of claim 6, wherein said beamforming calibration announcement packet comprises a calibration position field to indicate one of a unidirectional calibration sequence and a bidirectional calibration sequence.

11. The wireless communication device of claim 10, wherein said wireless communication unit is to determine both a source and an intended destination of said first null-data-packet based on first and second address fields of said beamforming calibration announcement packet.

12. A wireless communication system comprising:
a first wireless communication device comprising one or more antennas to perform beamforming communication with a second wireless communication device, wherein said first wireless communication device is to transmit a wireless beamforming calibration announcement packet to said second wireless communication device to announce both first and second null-data-packets to be exchanged between said first and second wireless communication devices, to transmit the first null-data-packet to the second wireless communication device after transmitting the beamforming calibration announcement packet, and to receive the second null-data packet from the second wireless communication device immediately successive to the first null-data-packet and prior to receiving another communication from the second wireless communication device, wherein, prior to transmitting said first null-data-packet, said first wireless communication device is to receive from the second wireless communication device a response packet, and wherein both said beamforming calibration announcement packet and said response packet comprise an announcement bit, the announcement bit of said beamforming calibration announcement packet having a first value, and the announcement bit of said response packet having a second value, different from said first value.

13. The system of claim 12, wherein said beamforming calibration announcement packet comprises a request-to-send indication, and wherein said response packet comprises a clear-to-send indication.

14. The system of claim 12, wherein said first and second wireless communication devices are capable of performing implicit beamforming calibration based on said second and first null-data-packets, respectively.

15. The system of claim 12, wherein said beamforming calibration announcement packet comprises a calibration position field to indicate one of a unidirectional calibration sequence and a bidirectional calibration sequence.

16. A method of wireless beamforming communication, the method comprising:
transmitting a wireless beamforming calibration announcement packet from a first wireless communication device to a second wireless communication device to announce both first and second null-data-packets to be exchanged between said first and second wireless communication devices;
receiving from the second wireless communication device a response packet, wherein both said beamforming calibration announcement packet and said response packet comprise an announcement bit, the announcement bit of said beamforming calibration announcement packet having a first value, and the announcement bit of said response packet having a second value, different from said first value;
transmitting from said first wireless communication device the first null-data-packet following said response packet; and
receiving the second null-data-packet from the second wireless communication device immediately successive to the first null-data-packet and prior to receiving another communication from the second wireless communication device.

17. The method of claim 16, wherein said beamforming calibration announcement packet comprises a request-to-send indication, and wherein transmitting said first null-data-packet comprises transmitting said first null-data-packet after receiving a response including a clear-to-send indication from the second wireless communication device.

18. The method of claim 16 comprising performing implicit beamforming calibration of a beamforming channel between the second and first wireless communication devices based on said second null-data-packet.

19. The method of claim 16, wherein transmitting said beamforming calibration announcement packet comprises transmitting an announcement packet including a calibration position field to indicate one of a unidirectional calibration sequence and a bidirectional calibration sequence.

20. The method of claim 16 comprising performing implicit beamforming calibration of a beamforming channel between the first and second wireless communication devices based on said first null-data-packet.

* * * * *

UNITED STATES PATENT AND TRADEMARK OFFICE
CERTIFICATE OF CORRECTION

| | | |
|---|---|---|
| PATENT NO. | : 8,238,274 B2 | Page 1 of 1 |
| APPLICATION NO. | : 12/045080 | |
| DATED | : August 7, 2012 | |
| INVENTOR(S) | : Trainin Solomon | |

It is certified that error appears in the above-identified patent and that said Letters Patent is hereby corrected as shown below:

In column 10, line 4, in claim 5, delete "calibration." and insert -- calibration sequence. --, therefor.

In column 10, line 59, in claim 12, delete "null-data packet" and insert -- null-data-packet --, therefor.

Signed and Sealed this
Fifteenth Day of January, 2013

David J. Kappos
*Director of the United States Patent and Trademark Office*